(12) United States Patent
Popescu et al.

(10) Patent No.: US 9,026,480 B2
(45) Date of Patent: May 5, 2015

(54) NAVIGATION SYSTEM WITH POINT OF INTEREST CLASSIFICATION MECHANISM AND METHOD OF OPERATION THEREOF

(75) Inventors: Liviu Teodor Popescu, Sunnyvale, CA (US); Pramod Lakshmi Narasimha, Sunnyvale, CA (US); Aliasgar Mumtaz Husain, Milpitas, CA (US)

(73) Assignee: Telenav, Inc., Sunnyvale, CA (US)

( * ) Notice: Subject to any disclaimer, the term of this patent is extended or adjusted under 35 U.S.C. 154(b) by 706 days.

(21) Appl. No.: 13/334,020

(22) Filed: Dec. 21, 2011

(65) Prior Publication Data

US 2013/0166480 A1 Jun. 27, 2013

(51) Int. Cl.
G06F 15/18 (2006.01)
G06N 99/00 (2010.01)

(52) U.S. Cl.
CPC .................................... *G06N 99/005* (2013.01)

(58) Field of Classification Search
USPC ........................................................... 706/12
See application file for complete search history.

(56) References Cited

U.S. PATENT DOCUMENTS

| | | | | |
|---|---|---|---|---|
| 6,081,803 | A * | 6/2000 | Ashby et al. ........................... 1/1 |
| 7,248,965 | B2 * | 7/2007 | Tanizaki et al. ................. 701/533 |
| 7,610,560 | B2 * | 10/2009 | Horvitz et al. ................. 715/764 |
| 7,835,859 | B2 * | 11/2010 | Bill ................................ 701/424 |
| 8,589,069 | B1 * | 11/2013 | Lehman ......................... 701/438 |
| 8,719,198 | B2 * | 5/2014 | Zheng et al. ..................... 706/21 |
| 8,892,121 | B2 * | 11/2014 | Morin ......................... 455/456.1 |
| 8,892,355 | B2 * | 11/2014 | Narasimha et al. ............ 701/426 |
| 2007/0016556 | A1 | 1/2007 | Ann et al. |
| 2009/0319177 | A1 * | 12/2009 | Khosravy et al. .............. 701/207 |
| 2009/0319178 | A1 * | 12/2009 | Khosravy et al. .............. 701/207 |
| 2011/0047509 | A1 * | 2/2011 | Arrasvuori ..................... 715/815 |
| 2011/0106429 | A1 * | 5/2011 | Poppen et al. ................. 701/201 |
| 2011/0109435 | A1 * | 5/2011 | Bickel et al. ..................... 340/8.1 |
| 2012/0185419 | A1 * | 7/2012 | Kuhn et al. ....................... 706/12 |
| 2013/0103697 | A1 * | 4/2013 | Hill et al. ....................... 707/748 |
| 2013/0124080 | A1 * | 5/2013 | Diao et al. ..................... 701/400 |
| 2013/0158855 | A1 * | 6/2013 | Weir et al. ..................... 701/400 |

OTHER PUBLICATIONS

Ana Alves, Bruno Antunes, Francisco C. Pereira, and Carlos Bento. 2009. Semantic enrichment of places: Ontology learning from web. Int. J. Know.-Based Intell. Eng. Syst. 13, 1 (Jan. 2009), 19-30.*

(Continued)

*Primary Examiner* — Jeffrey A Gaffin
*Assistant Examiner* — David H Kim
(74) *Attorney, Agent, or Firm* — IP Investment Law Group

(57) ABSTRACT

A method of operation of a navigation system includes: generating a training data from a randomly sampled uncategorized point of interest; generating a trained classifier model by training a classifier model using the training data; generating a category identifier, a confidence score, or a combination thereof for an uncategorized point of interest using the trained classifier model; generating a categorized point of interest by assigning the category identifier to the uncategorized point of interest; calculating a weighted confidence score based on a weighted F-measure for the category identifier, a pair of the category identifier and the confidence score; and consolidating the categorized point of interest based on the weighted confidence score for the category identifier being meeting or exceeding a threshold for displaying on a device.

18 Claims, 9 Drawing Sheets

(56) References Cited

OTHER PUBLICATIONS

George Forman. 2008. BNS feature scaling: an improved representation over tf-idf for svm text classification. In Proceedings of the 17th ACM conference on Information and knowledge management (CIKM '08). ACM, New York, NY, USA, 263-270.*

Tzvetan Horozov, Nitya Narasimhan, and Venu Vasudevan. 2006. Using Location for Personalized POI Recommendations in Mobile Environments. In Proceedings of the International Symposium on Applications on Internet (SAINT '06). IEEE Computer Society, Washington, DC, USA, 124-129.*

* cited by examiner

NAVIGATION SYSTEM WITH POINT OF INTEREST CLASSIFICATION MECHANISM AND METHOD OF OPERATION THEREOF

TECHNICAL FIELD

The present invention relates generally to a navigation system, and more particularly to a system for point of interest classification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other point of interest (POI). The real-time information provides invaluable relevant information.

However, points of interest (POIs) not easily searchable are of paramount concern to the consumer. Consumers looking for a particular type of point of interest will be unable to find it without an associated category identifier.

Thus, a need still remains for a navigation system with point of interest classification mechanism to support accurate searching points of interest by category. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a training data from a randomly sampled uncategorized point of interest; generating a trained classifier model by training a classifier model using the training data; generating a category identifier, a confidence score, or a combination thereof for an uncategorized point of interest using the trained classifier model; generating a categorized point of interest by assigning the category identifier to the uncategorized point of interest; calculating a weighted confidence score based on a weighted F-measure for the category identifier, a pair of the category identifier and the confidence score; and consolidating the categorized point of interest based on the weighted confidence score for the category identifier being meeting or exceeding a threshold for displaying on a device.

The present invention provides a navigation system, including: an active learning module for generating a training data from a randomly sampled uncategorized point of interest; a model training module, coupled to the active learning module, for generating a trained classifier model by training a classifier model using the training data; a classification module, coupled to the model training module, for generating a category identifier, a confidence score, or a combination thereof for an uncategorized point of interest and generating a categorized point of interest with the trained classifier model; and a consolidation module, coupled to the classification module, for calculating a weighted confidence score based on a weighted F-measure for the category identifier, a pair of the category identifier and the confidence score and consolidating the categorized point of interest based on the weighted confidence score for the category identifier being meeting or exceeding a threshold for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
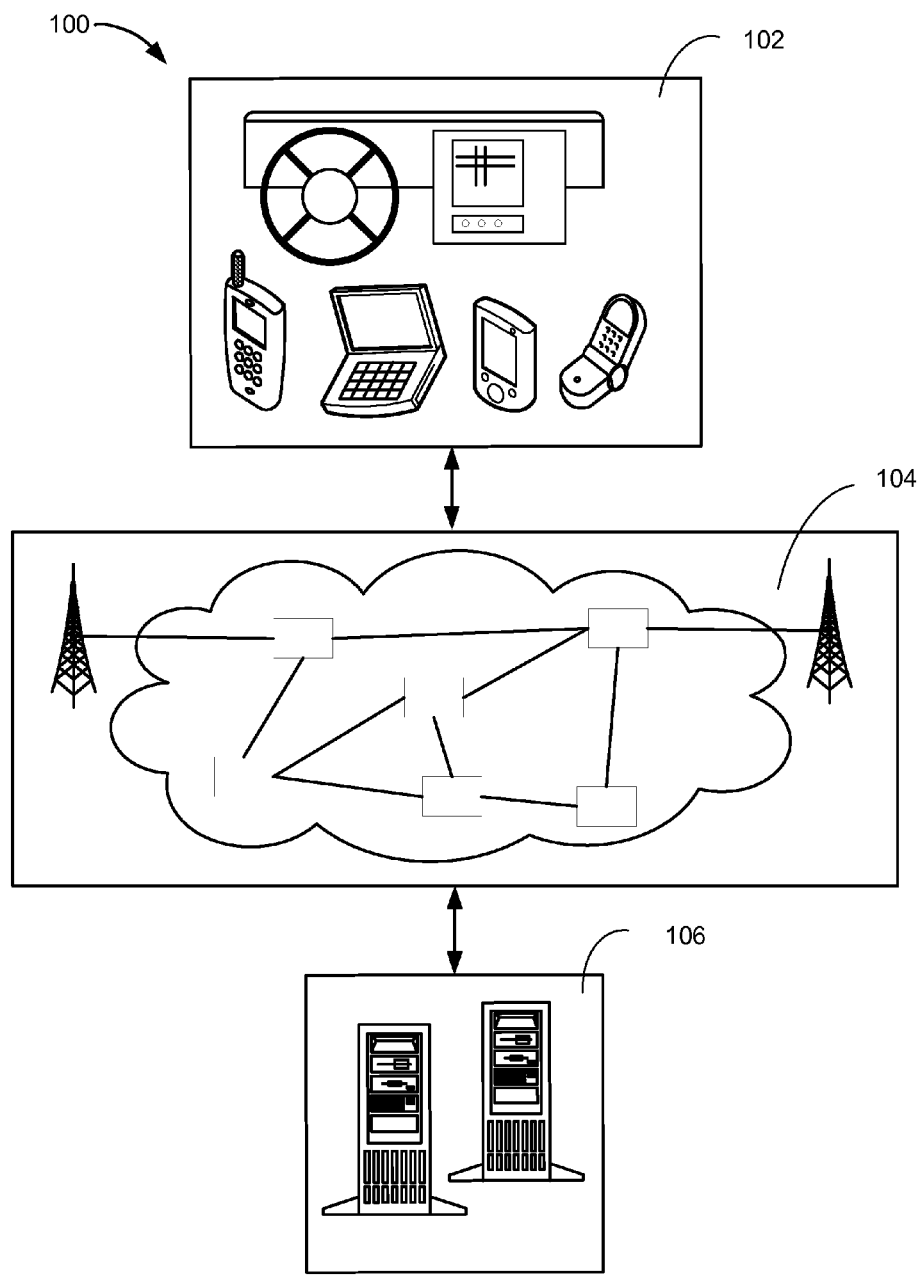
FIG. 1 is a navigation system with point of interest classification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown is a navigation system 100 with point of interest classification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
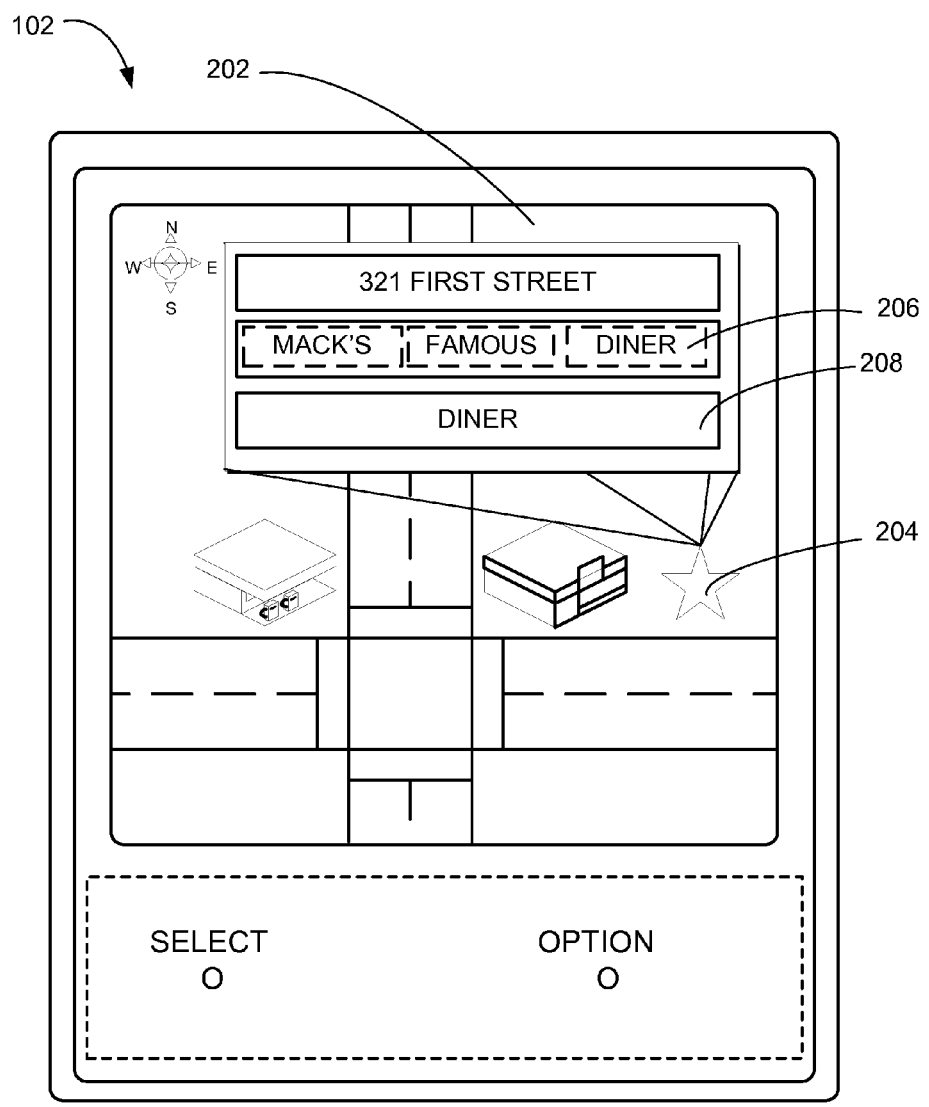
FIG. 2 is an example of a display on a display interface of the first device.

Referring now to FIG. 2, therein is shown an example of a display on a display interface 202 of the first device 102. The display interface 202 can depict a categorized point of interest 204, a point of interest term 206, and a category identifier 208.

The categorized point of interest 204 is defined as a point of interest that has an associated category or categories. For example, the categorized point of interest 204 can be Coit Tower (tourist attraction), Tokyo Tower (tourist attraction), the Sears Tower (office/tourist attraction), the Museum of Modern Art in New York City (museum/tourist attraction), Yellowstone (national park), the Louvre (museum/tourist attraction), the Mall of America (indoor mall/tourist attraction), Safeway™ (grocery store), or other locations. The categorized point of interest 204 can include an address, a name, a category, a description, or some combination thereof.

The point of interest term 206 can be derived from the categorized point of interest 204, and is defined as a partition of the text of the categorized point of interest 204. For example, the name of the categorized point of interest 204 can be broken down into single words, and all possible combinations of the words in their original order, including just a single word, can each be considered a single instance of the point of interest term 206.

The category identifier 208 is defined as the category that the categorized point of interest 204 is associated with. For example, a Starbucks™ at a particular address can be associated with the category identifier 208 of coffee shop, café, or some combination thereof. Also for example, a McDonald's™ at a particular address can be associated with the category identifier 208 of restaurant, fast food restaurant, or a combination thereof. The category identifier 208 can indicate many different kinds of categories such as 24-hour diner, Italian restaurant, shopping center, outlet mall, ice cream parlor, tourist attraction, or a combination thereof.

Figure 3:
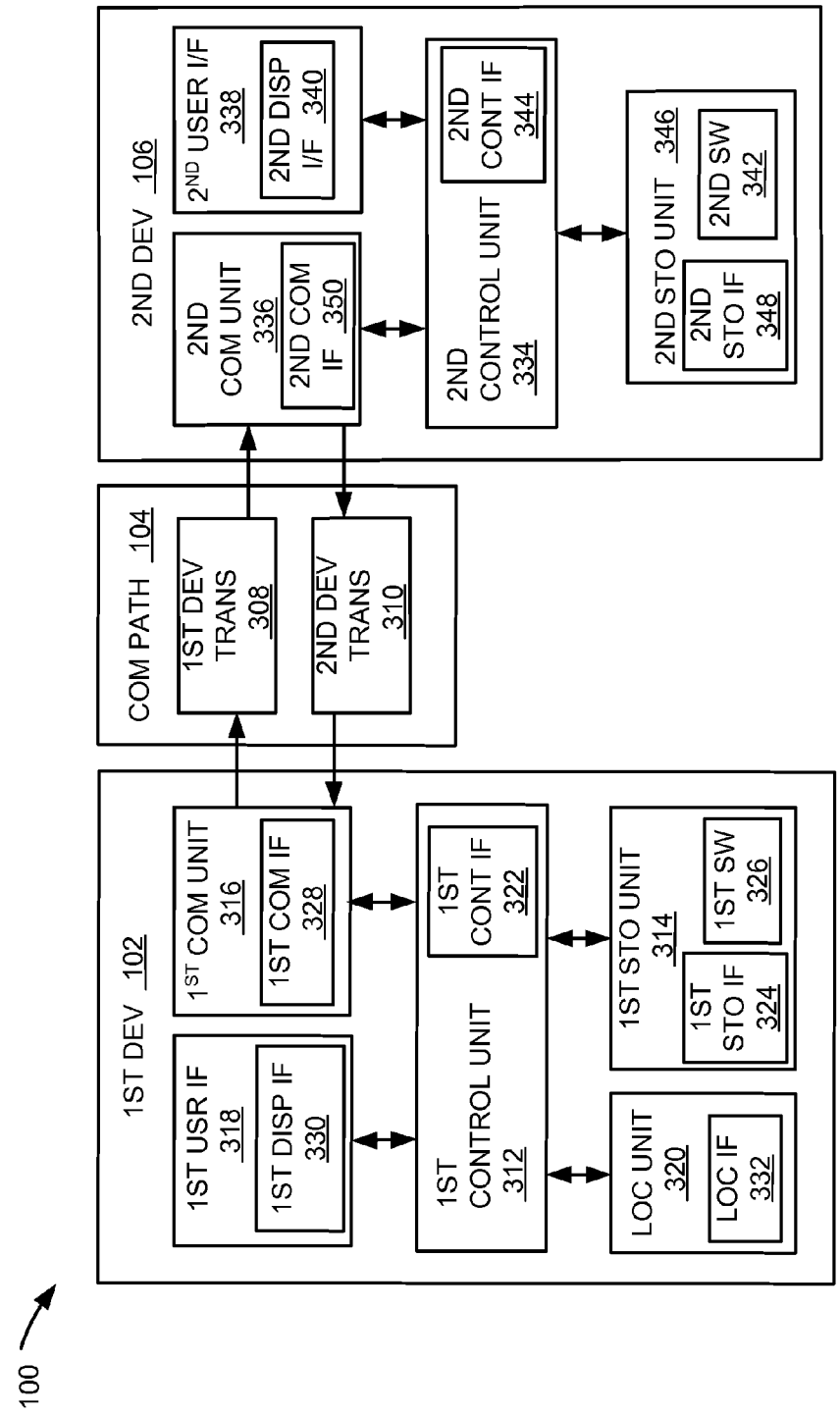
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, point of interest (POI), navigation routing entries, reviews/ratings, feedback, traffic patterns, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest, navigation routing entries, reviews/ratings, feedback, traffic patterns, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
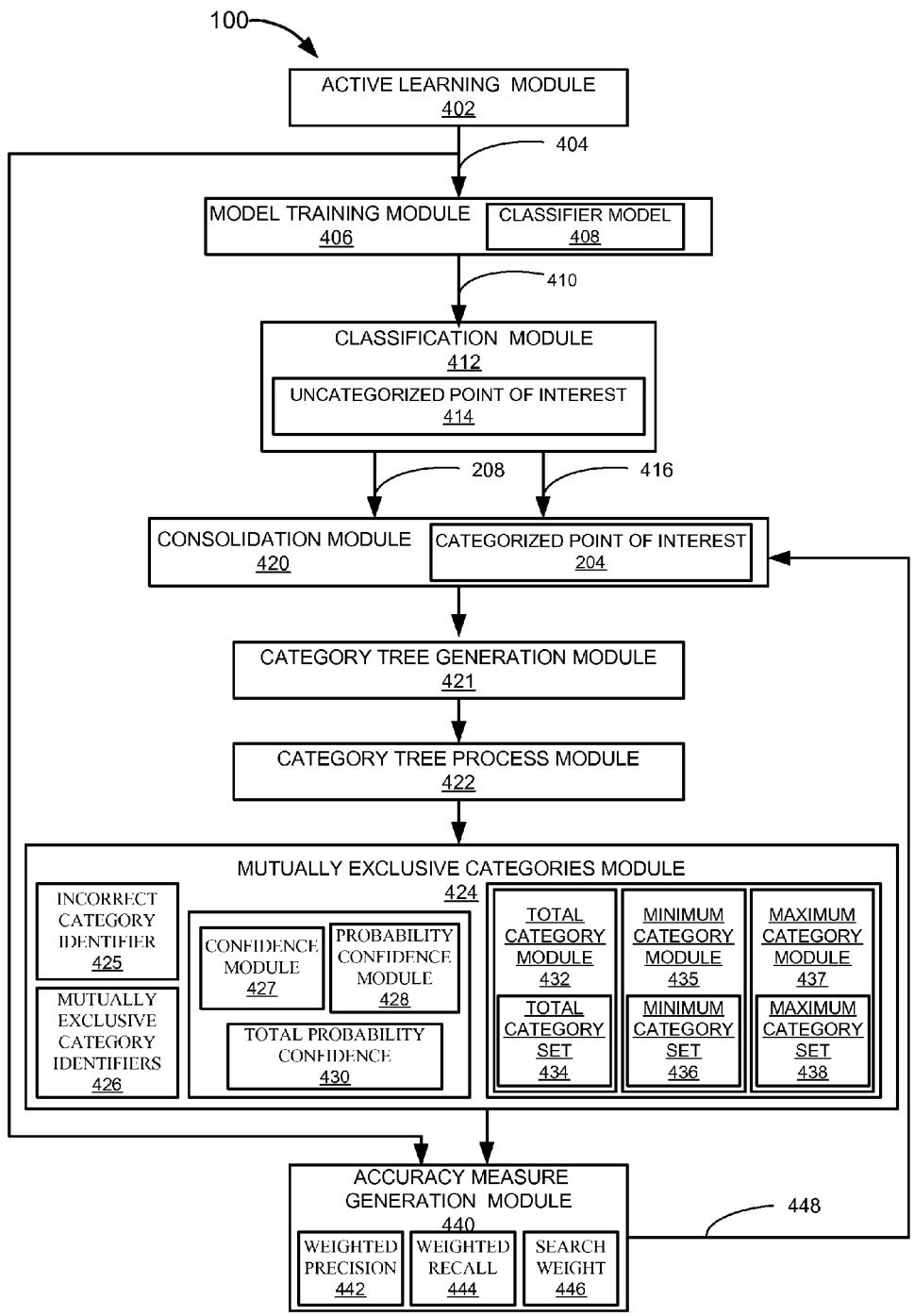
FIG. 4 is a control flow of the navigation system.

Referring now to FIG. 4, therein is shown a control flow of the navigation system 100 with point of interest classification mechanism. The navigation system 100 can include an active learning module 402. The active learning module 402 generates a training data 404 to train a classifier model 408. The process of the active learning module 402 will be detailed later in the specification.

The training data 404 is defined as a randomly sampled point of interest which is correctly classified. The training data 404 can be used to train the classifier model 408, calculate probability to remove an incorrect category identifier 425 from mutually exclusive category identifiers 426 and calculate a weighted F-measure 448.

The navigation system 100 can also include a model training module 406, coupled to the active learning module 402. The model training module 406 calculates a category score 632 for a point of interest term that can be used for training the classifier model 408. Given the training data 404, the feature and value pair, (term, $score_{T,C}$), is generated for a particular category. The model training module 406 utilizes these feature and value pairs to train the classifier model 408 and generate a trained classifier model 410. The process of the model training module 406 will be detailed later in the specification.

The category score 632 defines the statistical likelihood that a single instance of the point of interest term 206 of FIG. 2 will fall into a single instance of the category identifier 208. For example, the category score 632 can include a function that includes the point of interest term 206, the category identifier 208, and a score that ranks the combination.

The navigation system 100 can also include a classification module 412, coupled to the model training module 406. The classification module 412 generates the category identifier 208, a confidence score 416, or a combination thereof for an uncategorized point of interest 414 using the trained classifier model 410. The classification module 412 classifies a point of interest that has not yet been categorized to the categorized point of interest 204.

The confidence score 416 defines the normalized category score for a point of interest term which is ranged between 0 and 1. The uncategorized point of interest 414 is defined as a point of interest that has yet to be categorized. The uncategorized point of interest 414 can be the categorized point of interest 204 that has no category identifier 208 associated with the uncategorized point of interest 414. For example, the uncategorized point of interest 414 can be a new restaurant that has not been entered into any database, a new store of an existing franchise that recently opened, a recently renovated shopping mall with a new name, a store in a location not previously mapped, or a combination thereof.

The navigation system 100 can also include a consolidation module 420, coupled to the classification module 412. The consolidation module 420 receives input of the category identifier 208 along with the confidence score 416 associated with each point of interest from the classification module 412 and processes these data to consolidate the category identifier 208 for the categorized point of interest 204. The process of the consolidation module 420 will be detailed later in the specification.

The navigation system 100 can also include a category tree generation module 421. The category tree generation module 421 generates a category tree 804 using the categorized point of interest 204 from the consolidation module 420.

The navigation system 100 can also include a category tree process module 422, coupled to the category tree generation module 421. The category tree process module 422 processes the category tree 804 to eliminate a dangling node 806 and a corresponding descendant node 810 from the category tree 804. The pruning process of the category tree process module 422 will be detailed later in the specification.

The dangling node 806 is defined as a node in the category tree 804 that has no parent node when you search through the category tree 804 from leaf node to root node. The dangling node 806 is eliminated by the category tree process module 422 since the dangling node 806 does not belong to the category tree 804 of the categorized point of interest 204.

The navigation system 100 can also include a mutually exclusive categories module 424, coupled to the category tree process module 422. The mutually exclusive categories module 424 processes mutually exclusive category identifiers 426 for the categorized point of interest 204 by eliminating the incorrect category identifier 425.

Mutually exclusive category identifiers 426 define two category identifiers 208, for example $c_i$ and $c_j$, that cannot co-exist in a point of interest, and the joint probability, $P(c_i, c_j)=0$.

The mutually exclusive categories module 424 can be two hardware or software implementations. The following is the first implementation.

M is defined as a list of mutually exclusive category identifiers 426. $M=\{(c_1, c_2)^i\}$ $1 \leq i \leq N_{me}$ $N_{cp}$ is defined as total number of category identifiers assigned to the categorized point of interest 204.

H is defined as a hashmap with the category identifier 208, $c_n$, as key and the confidence score 416, $s_n$, as value. $1 \leq n \leq N_{cp}$ The first implementation of the mutually exclusive categories module 424 includes a confidence module 427. The confidence module 427 get the joint probabilities for a combination of category identifier pairs, $(c_i, c_j)$, from the training data 404, and mutually exclusive category identifiers 426. The confidence module 427 eliminates the incorrect category identifier 425 with the smaller confidence score 416 when there are only two category identifiers 208 assigned to the categorized point of interest 204.

The first implementation of the mutually exclusive categories module 424 also includes a probability confidence module 428. For the case there are more than two category identifiers 208 assigned to the categorized point of interest 204, the probability confidence module 428 calculates a total probability confidence 430 for each of the mutually exclusive category identifiers 426 based on joint probability for a combination of category identifier pairs and the confidence score 416, then eliminates the incorrect category identifier 425 with the smaller total probability confidence 430.

The first implementation of the mutually exclusive categories module 424 is shown in pseudo code format as the following Pseudo Code 1:

```
function MECategoriesProcessPC( ){
    for each POI{
        for(all (c_i,c_j) ⊂ M and (c_i,c_j) ⊂ H) {//for all (c_i,c_j) pairs belong to
        M and H
            if (N_cp == 2){
                if(s_i > s_j)
                    eliminate c_j
                else
                    eliminate c_i
            }
            else{
                P(c_i) = Σ_{k≠j} P(c_i, c_k) * s_k
                P(c_j) = Σ_{k≠i} P(c_j, c_k) * s_k
                if(P(c_i) > P(c_j))
                    eliminate c_j
                else
                    eliminate c_i
            }
        }
    }
}
```

Table 1 maps functions and elements from pseudo code 1 to the previously detailed modules and elements:

| Pseudo Code 1 Elements | Specification Modules or Elements |
|---|---|
| function MECategoriesProcessPC( ) | the first implementation of the mutually exclusive categories module 424 of FIG. 4 |
| if (N$_{cp}$ == 2){<br>  if(s$_i$ > s$_j$)<br>    eliminate c$_j$<br>  else<br>    eliminate c$_i$<br>} | confidence module 427 |
| else{<br>  P(c$_i$) = Σ$_{k≠j}$ P(c$_i$, c$_k$) * s$_k$<br>  P(c$_j$) = Σ$_{k≠i}$ P(c$_j$, c$_k$) * s$_k$<br>  if(P(c$_i$) > P(c$_j$))<br>    eliminate c$_j$<br>  else<br>    eliminate c$_i$<br>} | Probability confidence module 428 |
| P(c$_i$) = Σ$_{k≠j}$ P(c$_i$, c$_k$) * s$_k$ | total probability confidence 430 for c$_i$ |
| P(c$_j$) = Σ$_{k≠i}$ P(c$_j$, c$_k$) * s$_k$ | total probability confidence 430 for c$_j$ |
| s$_i$, s$_j$ | s$_i$ is the confidence score 416 for c$_i$<br>s$_j$ is the confidence score 416 for c$_j$ |
| (c$_i$, c$_j$) | category identifier pair |
| M | a list of mutually exclusive category identifiers 426 |

| Pseudo Code 1 Elements | Specification Modules or Elements |
| --- | --- |
| H | a hashmap with category identifier $c_n$ as key and confidence score $s_n$ as value. $1 \leq n \leq N_{cp}$ |
| $N_{cp}$ | total number of category identifiers assigned to a categorized point of interest |
| $P(c_j, c_k)$ | joint probability for $c_j$ and $c_k$. $c_j$ is one of the mutually exclusive categories $c_k$ is any of the categories assigned to the POI except $c_j$, $c_j$ is the other category of the mutually exclusive categories |
| $P(c_j, c_k) * s_k$ | probability confidence $s_k$ is the confidence score of any of the categories assigned to the POI except $c_j$ |

The first implementation of the mutually exclusive categories module 424 having pseudo code 1 and other modules discussed below having the pseudo codes that follow can be implemented in software, firmware, hardware, or a combination thereof. The pseudo codes describe the logic of the invention in exemplary form, and should not be read to limit implementation to any particular programming or hardware language or method of implementation.

The second implementation of the mutually exclusive categories module 424 is an alternative way of eliminating the incorrect category identifier 425. The second implementation of the mutually exclusive categories module 424 includes a total category module 432, a minimum category module 435, and a maximum category module 437. The total category module 432 searches a total category set 434 for the categorized point of interest 204. The minimum category module 435 generates a minimum category set 436 for the categorized point of interest 204. The maximum category module 437 eliminates the incorrect category identifier 425 from the total category set 434 by removing the minimum category set 436 and check if there is no mutually exclusive categories in a remaining maximum category set 438, then stop the operation. Otherwise, try different combination of the category set. The maximum category module 437 generates the maximum category set 438 without the incorrect category identifier 425.

Q is defined as the total category set 434 that belong to H and M for the categorized point of interest 204.

R is defined as combination of x category identifiers 208 from Q. $1 \leq x \leq N_{cp}-1$ S is defined as the remaining category identifier set, which is the result of complement of R in Q.

The second implementation of the mutually exclusive categories module 424 is shown in pseudo code format as the following Pseudo Code 2:

```
function MECategoriesProcessMC( ){
    for each POI{
        find Q = {(c_i,c_j)^r} for all c_i ⊂ H and c_j ⊂ H and (c_i,c_j) ⊂ M
        for x = 1 to N_cp -1{
            for each (R = subset of Q with size x){
                S = Q - R
                if ((S ∩ (c_i ⊂ H and c_j ⊂ H and (c_i, c_j) ⊂ M))== null){
                    H = H ∩ S // keep the largest subset without conflict
                    stop
                }
            }
        }
    }
}
```

Table 2 maps functions and elements from pseudo code 2 to the previously detailed modules and elements:

| Pseudo Code 2 Elements | Specification Modules or Elements |
| --- | --- |
| function MECategoriesProcessMC( ) | maximum combination module 432 of FIG. 4 |
| find Q = {$(c_i, c_j)^r$} for all $c_i \subset$ H and $c_j \subset$ H and $(c_i, c_j) \subset$ M | total category module 432 |
| Q | total category set 434 that belong to H and M for a categorized point of interest 204 |
| for x = 1 to $N_{cp}$ −1{ | minimum category module 435 |
| for each (R = subset of Q with size x){ | R is the minimum category set 436 |
| S = Q − R | maximum category module 437 |
| if ((S ∩ ($c_i \subset$ H and $c_j \subset$ H and $(c_i, c_j)$ ⊂ M))== null){ H = H ∩ S stop } | set S is the maximum category set 438 |
| $(c_i, c_j)$ | category identifier pair |
| M | a list of mutually exclusive category identifiers 426 |
| H | a hashmap with category identifier, $c_n$, as key and confidence score, $s_n$, as value. $1 \leq n \leq N_{cp}$ |
| $N_{cp}$ | total number of category identifiers assigned to a categorized point of interest |
| X | x = 1 to $N_{cp}$ −1 |

The navigation system 100 can also include an accuracy measure generation module 440, coupled to the mutually exclusive categories module 424. The accuracy measure generation module 440 calculates the accuracy measure based on the training data 404 from the active learning module 402 and the categorized point of interest 204 from the mutually exclusive categories module 424. The weighted F-measure 448 calculated can be used as the weight by the consolidation module 420 and the point of interest classification accuracy is improved through multiple iterations. For each category, the n-fold cross-validation is performed and a precision, a recall and an F-measure are computed.

$T_p$ is defined as the number of true positives.
$F_p$ is defined as the number of false positives.
$F_n$ is defined as the number of false negatives.

$$\text{Precision} = \frac{T_p}{T_p + F_p} \quad \text{Equation 1}$$

$$\text{Recall} = \frac{T_p}{T_p + F_n} \quad \text{Equation 2}$$

The F-measure is defined as the harmonic mean between the precision, as defined by the equation above, and the recall, as defined by the equation above, is also defined as accuracy measure shown in the below equation.

$$F = 2 * \frac{\text{precision} * \text{recall}}{\text{precision} + \text{recall}} \quad \text{Equation 3}$$

The enhancement for the F-measure and computation of average and weighted precision, recall and F-measure are shown in the following math equations. The F measure weighs equally between the precision and the recall. But if the recall weighs 0 times as much as the precision, the F-measure can be represented by the math equation as below:

$$F_\beta = (1 + \beta^2) * \frac{\text{precision} * \text{recall}}{\beta^2 * \text{precision} + \text{recall}} \quad \text{Equation 4}$$

However, for datasets containing large number of categories, the accuracy measure generation module 440 can measure the accuracy for the categories in order to determine the overall accuracy of the navigation system 100.

Given a set of n categories, an Average Precision is the mean of the precision of each of the categories in the set, an Average Recall is the mean of the recall of each of the categories in the set and an Average F-measure is the mean of the F-measure of each of the categories in the set.

$$\text{Average Precision} = \frac{1}{n} \sum_i \text{precision}_i \quad \text{Equation 5}$$

$$\text{Average Recall} = \frac{1}{n} \sum_i \text{recall}_i \quad \text{Equation 6}$$

$$\text{Average } F_\beta = \frac{1}{n} \sum_i F_\beta^i \quad \text{Equation 7}$$

The categories for point of interest are not equal in size or importance for our problem. In order to measure more precisely the overall performance over a set of categories, a weighted precision 442, a weighted recall 444 and the weighted F-measure 448 is used over the set of categories.

$$\text{Weighted Precision} = \frac{1}{n} \sum_i \text{weight}_i * \text{precision}_i \quad \text{Equation 8}$$

$$\text{Weighted Recall} = \frac{1}{n} \sum_i \text{weight}_i * \text{recall}_i \quad \text{Equation 9}$$

$$\text{Weighted } F_\beta = \frac{1}{n} \sum_i \text{weight}_i * F_\beta^i \quad \text{Equation 10}$$

$$\sum_i \text{weight}_i = 1 \quad \text{Equation 11}$$

The weighted F-measure 448 is defined as the harmonic mean between the weighted precision 442, as defined by the equation above, and the weighted recall 444, as defined by the equation above, is also defined as weighted accuracy measure shown in the above equation.

A search weight 446 is obtained by the search requests. The search weight 446 is defined as the number of searches for each category normalized with the total number of searches. For example, if there are 100 searches for category A, 200 searches for category B and the total number of searches is 1000, then the search weights 446 for category A and B would be 0.1 and 0.2 respectively.

The active learning module 402 can be implemented by the navigation system 100. The active learning module 402 can be implemented by the second control unit 334 of FIG. 3, and can make use of the second storage unit 346 of FIG. 3, the second software 342 of FIG. 3, the second communication unit 336 of FIG. 3, or some combination thereof.

For example, the active learning module 402 can receive a randomly sampled uncategorized point of interest 507 from the second communication unit 336 and store the uncategorized point of interest 414 in the second storage unit 346 by utilizing the second control unit 334. The active learning module 402 can also utilize the second control unit 334 to operate the second software 342 to generate the training data 404 and store the training data 404 in the second storage unit 346.

For illustrative purposes, the active learning module 402 is described as being implemented by the second control unit 334, although it is understood that the active learning module 402 can be implemented differently. For example, the active learning module 402 can utilize the first control unit 312 retrieve the training data 404 from the first storage 314. The active learning module 402 can utilize the first control unit 312 to control the first software 326 to operate the first communication unit 316 and transit the training data 404 to the second storage unit 346.

The model training module 406 can be implemented by the navigation system 100. The model training module 406 can be implemented by the second control unit 334 of FIG. 3, the second storage unit 346 of FIG. 3, the second software 342 of FIG. 3, or some combination thereof. For example, the model training module 406 can utilize the second control unit 334 to store the training data 404 in the second storage unit 346. The second control unit 334 can operate the second software 342 to analyze the training data 404 to generate the category score 632 that can be used for training the classifier model 408.

For illustrative purposes, the model training module 406 is described as being implemented by the second control unit 334, although it is understood that the model training module 406 can be implemented differently. For example, the model training module 406 can utilize the first control unit 312 to operate the first software 326 to train the classifier model 408. The trained classifier model 410 can be retrieved from the first storage unit 314 and transmit through the first communication unit 316 to the second storage unit 346.

The classification module 412 can be implemented by the navigation system 100. The classification module 412 can be implemented with the first control unit 312 of FIG. 3 and can make use of the first software 326 of FIG. 3, the first storage unit 314 of FIG. 3, the first communication unit 316 of FIG. 3, or some combination thereof. For example, the classification module 412 can receive the uncategorized point of interest 414 and store the uncategorized point of interest 414 in the first storage unit 314 by utilizing the first control unit 312.

The classification module 412 can use the first communication unit 316 to receive the classifier model 408 from the second software 342 which can be implemented by the second control unit 334 and then store the classifier model 408 in the first storage unit 314. The classification module 412 can utilize the first control unit 312 to operate the first software 326 to apply the trained classifier model 410 which is implemented by the second software 342 to the uncategorized point of interest 414 and generate the category identifier 208, the confidence score 416, or a combination thereof associated with the categorized point of interest 204. Also for example, after the first software 326 is used to generate the category identifier 208, the first control unit 312 can operate the first display interface 330 to display the category identifier 208.

For illustrative purposes, the classification module 412 is described as being implemented by the first control unit 312, with values being stored in the first storage unit 314, although it is understood that the classification module 412 can be implemented differently. For example, the classification module 412 can be implemented by the second control unit 334, with the uncategorized point of interest 414 and the classifier model 408 being stored in the second storage unit 346 of FIG. 3. Also for example, the second control unit 334 can generate the category identifier 208 and use the second communication unit 336 of FIG. 3 to send the category identifier 208 to the first storage unit 314.

The consolidation module 420 can be implemented by the navigation system 100. The consolidation module 420 can be implemented with the first control unit 312 of FIG. 3 and can make use of the first software 326 of FIG. 3, the first storage unit 314 of FIG. 3, the first communication unit 316 of FIG. 3, or some combination thereof. For example, the consolidation module 420 can receive the category identifier 208 along with the confidence score 416 associated with a point of interest and store them in the first storage unit 314 by utilizing first control unit 312.

For illustrative purposes, the consolidation module 420 is described as being implemented by the first control unit 312, although it is understood that the consolidation module 420 can be implemented differently. For example, the consolidation module 420 can utilize the second control unit 334 to operate the second software 342 to generate a weighted confidence score 712 for the category identifier. Also for example, the second control unit 334 can operate the second communication unit 336 to transmit the categorized point of interest 204 with the weighted confidence score 712 meeting or exceeding a threshold 716 to the second storage unit 346.

The category tree generation module 421 can be implemented by the navigation system 100. The category tree generation module 421 can be implemented with the first control unit 312 of FIG. 3, the first software 326 of FIG. 3, the first storage unit 314 of FIG. 3, the first communication unit 316 of FIG. 3, or some combination thereof. For example, the category tree generation module 421 can receive the categorized point of interest 204 from the first communication unit 316 and store the categorized point of interest 204 in the first storage unit 314 by utilizing the first control unit 312.

For illustrative purposes, the category tree generation module 421 is described as being implemented by the first control unit 312, although it is understood that the category tree generation module 421 can be implemented differently. For example, the second control unit 334 can operate the second software 342 to add the category tree node to the category tree 804.

The category tree process module 422 can be implemented by the navigation system 100. The category tree process module 422 can be implemented with the first control unit 312 of FIG. 3, the first software 326 of FIG. 3, the first storage unit 314 of FIG. 3, the first communication unit 316 of FIG. 3, or some combination thereof. For example, the category tree process module 422 can utilize the first control unit 334 to transmit the categorized point of interest 204 through the first communication unit 316 to the second storage unit 346.

For illustrative purposes, the category tree process module 422 is described as being implemented by the first control unit 312, although it is understood that the category tree process module 422 can be implemented differently. For example, the second control unit can operate the second software to remove the dangling node 806 from the category tree 804. The first storage unit 314 can receive the categorized point of interest 204 which is transmit from the second communication unit 336 to the first communication unit 316 by utilizing the second control unit 334.

The mutually exclusive categories module 424 can be implemented by the navigation system 100. The mutually exclusive categories module 424 can be implemented with the first control unit 312 of FIG. 3 and can make use of the first software 326 of FIG. 3, the first storage unit 314 of FIG. 3, the first communication unit 316 of FIG. 3, the first display interface 330, or some combination thereof. For example, the mutually exclusive categories module 424 can utilize the first control unit 312 to operate the first software 326 to remove the incorrect category identifier 425 from the mutually exclusive category identifiers 426.

For illustrative purposes, the mutually exclusive categories module 424 is described as being implemented by the first control unit 312, although it is understood that the mutually exclusive categories module 424 can be implemented differently. For example, the mutually exclusive categories module 424 can utilize the second control unit 334 to operate the second display interface 340 to display the categorized point of interest 204. The mutually exclusive categories module 424 can transmit the categorized point of interest 204 through the second communication unit 336 to the first storage unit 314 by utilizing the second control unit 334.

The accuracy measure generation module 440 can be implemented by the navigation system 100. The accuracy measure generation module 440 can be implemented with the second control unit 334 of FIG. 3 and can make use of the second software 342 of FIG. 3, the second storage unit 346 of FIG. 3, the second communication unit 336 of FIG. 3, or some combination thereof. For example, the accuracy measure generation module 440 can receive the training data 404 and the categorized point of interest 204 and store them in the second storage unit 346 by utilizing the second control unit 334.

For illustrative purposes, the accuracy measure generation module 440 is described as being implemented by the second control unit 334, although it is understood that the accuracy measure generation module 440 can be implemented differently. For example, the first control unit 312 can operate the first software 326 to calculate the weighted F-measure 448. The first control unit 312 can transmit the weighted F-measure 448 through the first communication unit 316 to the second storage.

The modules in FIG. 4 can be implemented by hardware acceleration units (not shown) in the control units or separate hardware units (not shown) outside the control units but with the first device 102 or the second device 106.

Figure 5:
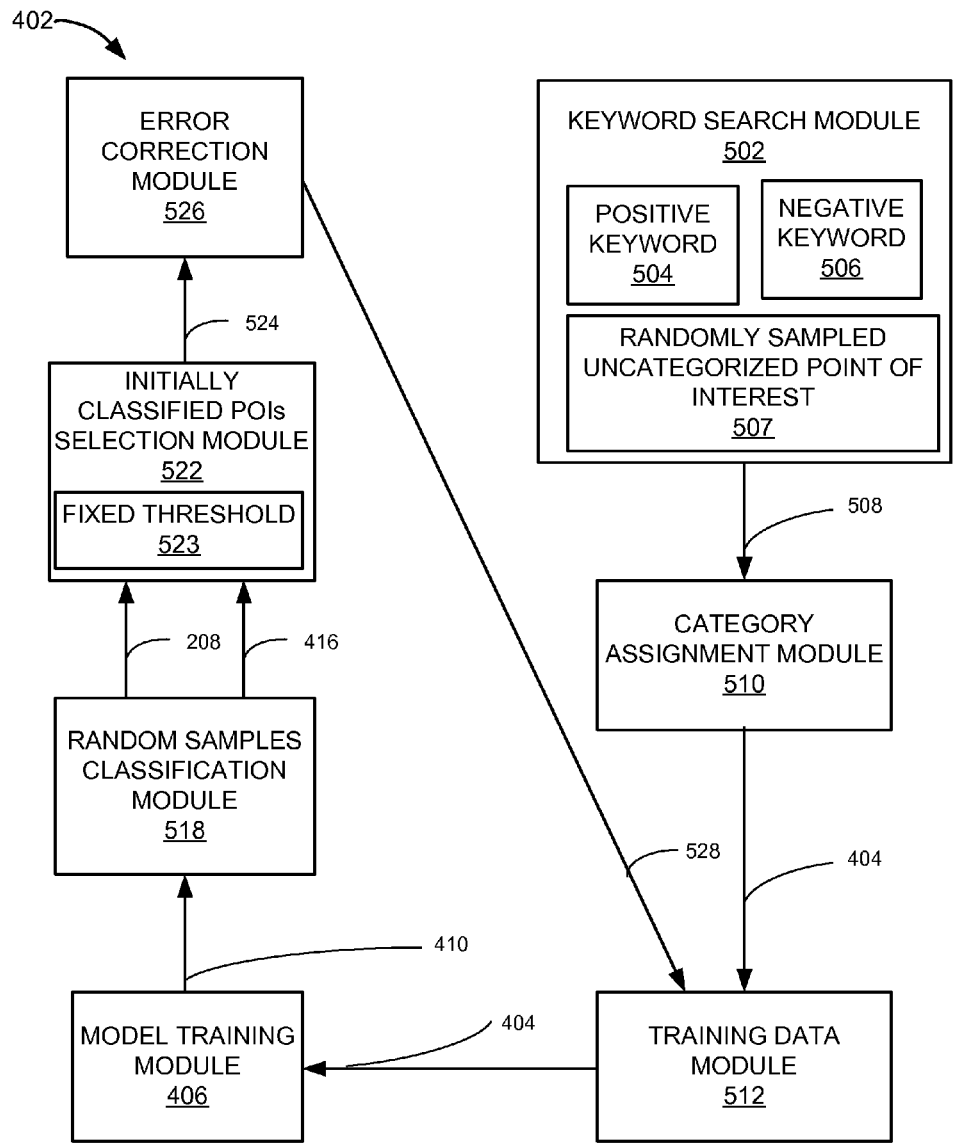
FIG. 5 is a control flow of the active learning module.

Referring now to FIG. 5, therein is shown a control flow of the active learning module 402. The active learning module 402 generates the training data 404 to train the classifier model 408 of FIG. 4 for each category from the randomly sampled uncategorized point of interest 507.

The active learning module 402 can include a keyword search module 502. The keyword search module 502 generates a random query result 508 by querying the randomly sampled uncategorized point of interest 507 with a positive keyword 504 and a negative keyword 506 for each category.

The positive keyword 504 is defined as a word or a string of words that appears in a point of interest category. For example, the positive keyword 504 for fast food includes pizza, hamburger, French fries, or a combination thereof.

The negative keyword 506 is defined as a word or a string of words that does not occur in a point of interest category. For example, the negative keyword 506 for fast food includes museum, theater, cloth, or a combination thereof.

The active learning module 402 can also include a category assignment module 510, coupled to the keyword search module 502. The category assignment module 510 can go through the random query result 508 and verify if each of the uncategorized point of interest 414 is positive or negative for the category identifier 208. Then the category assignment module 510 associates the positive point of interest with the category identifier 208, and passes a correctly categorized point of interest 528 to a training data module 512.

The active learning module 402 can also include the model training module 406, coupled to the training data module 512. The model training module 406 utilizes the training data 404 to train the classifier model 408 and generates the trained classifier model 410.

The active learning module 402 can also include a random samples classification module 518, coupled to the model training module 406. The random samples classification module 518 updates the category identifier 208, the confidence score 416, or a combination thereof by classifying the randomly sampled uncategorized point of interest 507 utilizing the trained classifier model 410.

The active learning module 402 can also include an initially classified POIs selection module 522, coupled to the random samples classification module 518. The initially classified POIs selection module 522 decides an initially classified POI 524 based on the confidence score 416 for the category identifier 208 being less than a fixed threshold 523. The initially classified POI 524 is defined as the categorized point of interest 204 with the incorrect category identifier 425. The fixed threshold 523 is defined as the confidence score 416 which decides initial or correct classification. The categorized point of interest 204 with the confidence score 416 less than the fixed threshold 523 is the initially classified POI 524.

The active learning module 402 can also include an error correction module 526, coupled to the initially classified POIs selection module 522. The error correction module 526 checks the initially classified POI 524, corrects the classification error and updates the training data 404 with the correctly categorized point of interest 528.

The modules in FIG. 5 can be implemented by hardware acceleration units (not shown) in the control units or separate hardware units (not shown) outside the control units but with the first device 102 or the second device 106.

Figure 6:
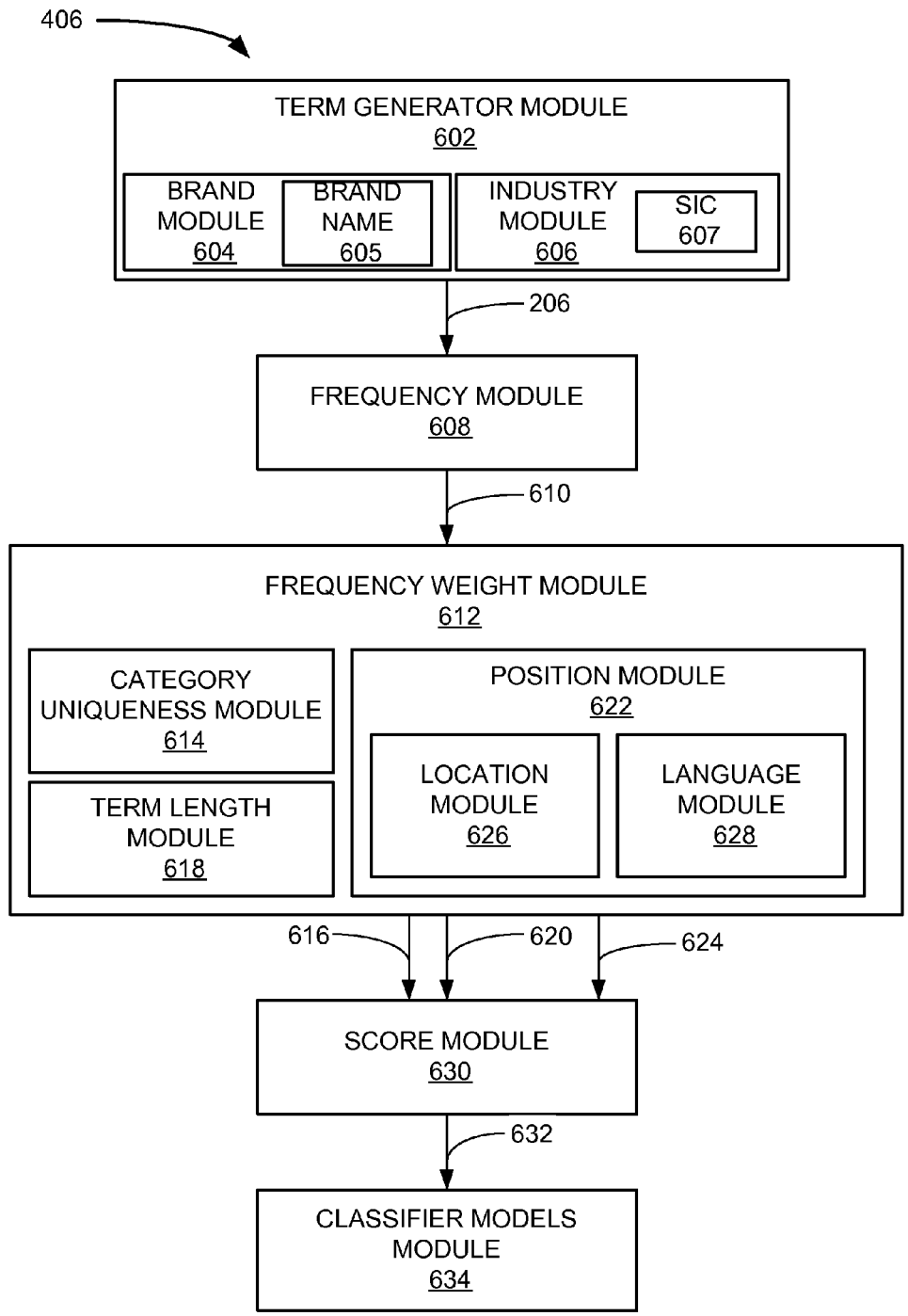
FIG. 6 is a control flow of the model training module.

Referring now to FIG. 6, therein is shown a control flow of the model training module 406. The model training module 406 utilizes the training data 404 of FIG. 4, which is the categorized point of interest 204 of FIG. 2, with the associated category identifier 208 of FIG. 2 to generate the category score 632. The category score 632 for each point of interest term can be used to train the classifier model 408.

The model training module 406 can include a term generator module 602. The term generator module 602 receives the training data 404 and uses the categorized point of interest 204 to generate the point of interest term 206. The process for generating the point of interest term 206 is detailed below.

The term generator module 602 can include a brand module 604. The brand module 604 generates the point of interest term 206 from the brand name 605 of the categorized point of interest 204.

For example, the brand name 605 can be McDonald's™, Best Buy™, Costco Wholesale™, Six Flags Magic Mountain™, or a combination thereof. The brand module 604 can generate the point of interest term 206 in a number of ways. The brand module 604 can take the brand name 605 and use each word in the brand name 605 as a single instance of the point of interest term 206. The brand module 604 can take the brand name 605 and while keeping the words in order, partition the brand name 605 into different combinations of multiple words, including the original combination of the words in the brand name 605. For example, for the brand name 605 "Six Flags Magic Mountain," the brand module 604 can create the following list of instances of the point of interest term 206:

1. Six
2. Flags
3. Magic
4. Mountain
5. Six Flags
6. Flags Mountain
7. Magic Mountain
8. Six Flags Magic
9. Flags Magic Mountain
10. Six Flags Magic Mountain For illustrative purposes, the brand module 604 is described as operating in English, although it is understood that the brand module 604 can operate differently. For example, the brand module 604 can receive the categorized point of interest 204 in a different language such as German, Spanish, Chinese, Japanese, or a combination thereof.

The term generator module 602 can also include an industry module 606. The industry module 606 generates the point of interest term 206 from the standard industry code (SIC) 607 of the categorized point of interest 204.

The standard industry code 607 can be like the following example: ENVIRONMENTAL & ECOLOGICAL SERVICES|WATER & SEWAGE COMPANIES-UTILITY|PRIMARY RESOURCES/UTILITIES. In this example, each section split by the "|" symbol is a node. The industry module 606 can create the point of interest term 206 from the standard industry code 607 by dividing the standard industry code 607 into nodes along the "|" boundary, and further partitioning the nodes into instances of the point of interest term 206 in the same manner of operation as the brand module 604. For example, the nodes would be "Environmental & Ecological Services," "Water & Sewage Companies-Utility," and "Primary Resources/Utilities." Also for example, the first node can be partitioned into the following list of instances of the point of interest term 206:
1. Environmental
2. &
3. Ecological
4. Services
5. Environmental &
6. & Ecological
7. Ecological Services
8. Environmental & Ecological
9. & Ecological Services
10. Environmental & Ecological Services For illustrative purposes, the standard industry code 607 is described as it would appear in the United States, although it is understood that different countries can have different standardized descriptions for businesses or locations. For example, a different country may not have nodes in that country's equivalent to the standard industry code 607.

The model training module 406 can also include a frequency module 608, coupled to the term generator module 602. The frequency module 608 calculates a term frequency 610 for the point of interest term 206 based on the category identifier 208, the point of interest term 206, and the categorized point of interest 204. The term frequency 610 is defined as the number of times the point of interest term 206 appears in a particular grouping of instances of the categorized point of interest 204. For example, for the point of interest term 206 in regards to each instance of the category identifier 208, let the following be true:
1. n=the number of instances of the categorized point of interest 204 that contain the point of interest term 206 for each instance of the category identifier 208
2. N=the total number of instances of the categorized point of interest 204 associated with the category identifier 208
3. m=the total number of instances of the categorized point of interest 204 that contain the point of interest term 206

Continuing the example, Equation 12 (below) can represent the term frequency 610 for the point of interest term 206.

$$\text{The term frequency} = \left(\frac{n}{N} - \frac{m-n}{m} + 1\right) \quad \text{Equation 12}$$

In Equation 12, for example, the term n/N can represent the frequency at which a term appears, and the term (m−n)/m can represent the inverse document frequency. The difference between n/N and (m−n)/m can represent the basis for the term frequency 610.

For illustrative purposes, the frequency module 608 is described as calculating the term frequency 610 in one particular way, although it is understood that the term frequency 610 could be calculated differently. For example, the number of instances of the point of interest term 206 could be compared to the number of instances of the categorized point of interest 204 that contained the point of interest term 206.

The model training module 406 can also include a frequency weight module 612, coupled to the frequency module 608. The frequency weight module 612 weighs each instance of the term frequency 610 based on the categorized point of interest 204, the category identifier 208, and the point of interest term 206. The frequency weight module 612 can include a category uniqueness module 614, a term length module 618, and a position module 622.

The category uniqueness module 614 calculates a category uniqueness factor 616 for weighting the term frequency 610.

The category uniqueness factor 616 represents the uniqueness of the category identifier 208 among the instances of the categorized point of interest 204. For example, for the category identifier 208 associated with a particular instance of the point of interest term 206 from the categorized point of interest 204, let $N_p$ represent the total number of instances of the categorized point of interest 204, and N represent the total number of instances of the categorized point of interest 204 associated with the category identifier 208. Continuing the example, the category uniqueness factor can be represented by Equation 13, which follows:

$$\text{The category uniqueness factor } 616 = \frac{1}{2 \cdot \log \frac{N_p}{N}} \quad \text{Equation 13}$$

Also for example, the logarithmic function used in Equation 13 can be used to normalize the category uniqueness factor 616 for ease of comparison between different instances of the category identifier 208.

For illustrative purposes, the category uniqueness module 614 is described as calculating the category uniqueness factor 616 in a particular way, although it is understood that the category uniqueness module 614 can operate differently. For example, the category uniqueness module 614 can calculate the category uniqueness factor 616 without using a logarithmic function.

The term length module 618 calculates a term length factor 620 based on the number of words in the point of interest term 206. The term length factor 620 can represent the total number of words in a particular instance of the point of interest term 206. For example, the more words there are in the point of interest term 206, the stronger the term length module 618 can calculate the term length factor to be, and the more heavily the term length factor 620 can weigh the term frequency 610.

The position module 622 calculates a position factor 624 based on the position of the point of interest term 206 within the categorized point of interest 204. The position factor 624 can represent the importance of the point of interest term 206 at a particular position within the brand name 605. For example, the point of interest term 206 that comprises the word or words at the end of the brand name 605 can be weighted more heavily than the point of interest term 206 at the beginning of the brand name 605 since the point of interest term 206 at the beginning is more likely to be a name rather than a descriptive word. Also for example, if the categorized point of interest 204 is "John's Burger Shack," the point of interest term 206 "Burger Shack" can be weighted more heavily than the point of interest term 206 "John's."

The position module 622 can include a location module 626 and a language module 628 for modifying the position factor 624 based on the geographic location and the local language. The location module 626 modifies the position factor 624 based on the geographic location. The language module 628 modifies the position factor 624 based on the local language and the language of the categorized point of interest 204. For example, if the point of interest term 206 is "Torito" from the categorized point of interest 204 El Torito™, and the location module 626 returns the geographic location as the United States, the language module 628 can modify the position factor 624 to weigh less heavily since the brand name 605 is in Spanish rather than English. Also for example, the location module 626 can modify the position factor 624 to be more heavily weighted for "Torito" if the category identifier 208 is "Mexican restaurant."

For illustrative purposes, the position module 622 is described as working within the geographic location of the United States, although it is understood that the position module 622 can work differently if operating within a different country such as Italy, Japan, or other country. For example, in Italy the first word in the brand name 605 can be weighted more heavily since the typical restaurant name could be something like "Ristorante Fiore," with "Ristorante" as the first word in the brand name 605 indicating the type of business (a restaurant) rather than just a name. Also for example, in countries with non-roman alphabets such as Japan, the position module 622 can still operate based on the unique naming conventions of the country by modifying the position factor 624 using the location module 626 and the language module 628.

The model training module 406 can also include a score module 630, coupled to the frequency weight module 612. The score module 630 generates the category score 632 for a point of interest term based on the term frequency 610, the category uniqueness factor 616, the term length factor 620, and the position factor 624. The category score 632 represents the statistical likelihood that a single instance of the point of interest term 206 is associated with a single instance of the category identifier 208. For example, the term frequency 610 can be represented as in Equation 12, the category uniqueness factor 616 can be represented as in Equation 13, the term length factor 620 can be represented by $N_t$, the position factor 624 can be represented by the letter w, and consequently the category score 632 can be calculated by the score module 630 as below in Equation 14:

$$\text{The category score } 632 = \left(\frac{n}{N} - \frac{m-n}{m} + 1\right) \cdot \frac{1}{2 \cdot \log \frac{N_p}{N}} \cdot N_t \cdot w \quad \text{Equation 14}$$

For illustrative purposes, the score module 630 is described as operating in a specific way, although it is understood that the score module 630 can operate differently. For example, the score module 630 can use more weighting factors, fewer weighting factors, other modifiers, or some combination thereof.

The model training module 406 can also include a classifier models module 634, coupled to the score module 630. The classifier models module 634 trains the classifier model 408 by using the category score 632 for the point of interest term 206. The trained classifier model 410 can be used by the classification module 412 to classify the uncategorized point of interest 414.

The modules in FIG. 6 can be implemented by hardware acceleration units (not shown) in the control units or separate hardware units (not shown) outside the control units but with the first device 102 or the second device 106.

Figure 7:
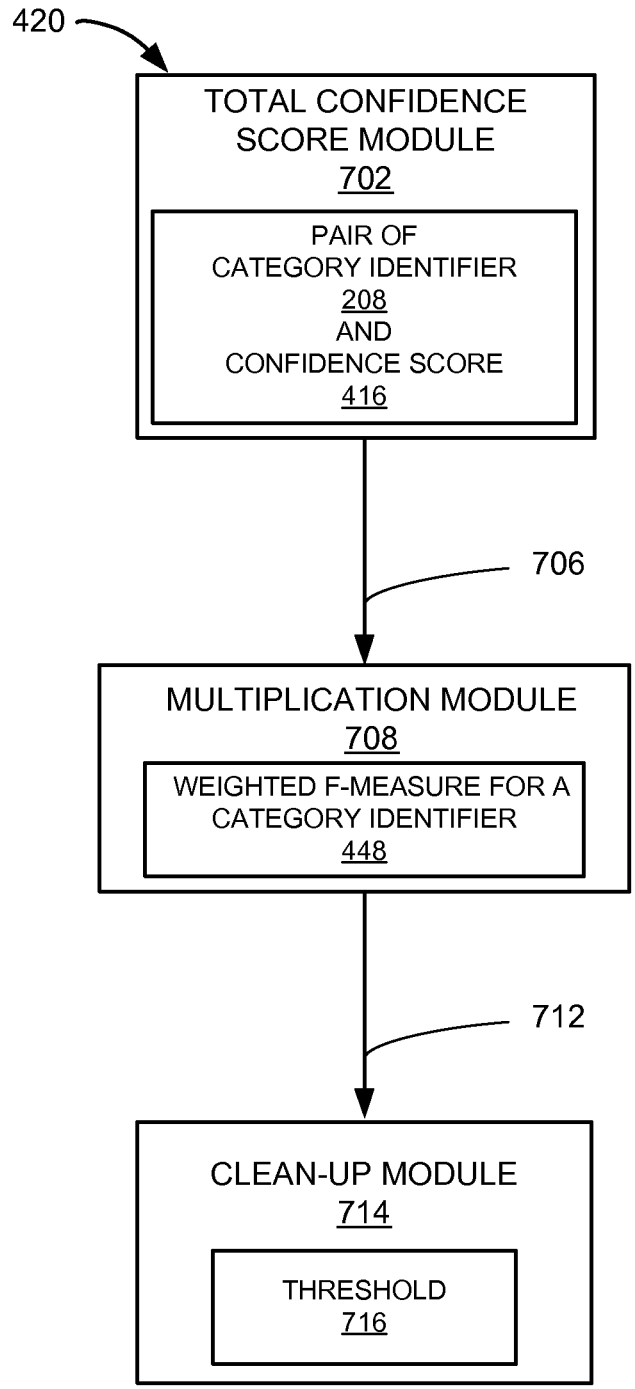
FIG. 7 is a control flow of the consolidation module.

Referring now to FIG. 7, therein is shown a control flow of the consolidation module 420. The consolidation module 420 calculates the weighted confidence score 712 for the category identifier 208 based on the pair of the category identifier 208 and the confidence score 416 for the categorized point of interest 204 of FIG. 2, and the weighted F-measure 448 for the category identifier 208. Then the consolidation module 420 determines the category identifier 208 for the categorized point of interest 204 based on the weighted confidence score 712 being meeting or exceeding the threshold 716 for displaying on the device 102 of FIG. 1. The input of the consolidation module 420 is the pair of the category identifier 208 and the confidence score 416 for the categorized point of interest 204, which are the output of the classification module 412 of FIG. 4.

The threshold 716 is defined as the weighted confidence score 712 which decides the initially classified POI 524 of FIG. 5. The consolidation module 420 eliminates the category identifier 208 with the weighted confidence score 712 less than the threshold 716 for the categorized point of interest 204.

The consolidation module 420 can include a total confidence score module 702. The total confidence score module 702 accumulates the total confidence score 706 for the category identifier 208 from the pair of the category identifier 208 and the confidence score 416, and stores the total confidence score 706 in the hashmap H which contains the category identifier 208 as key and the total confidence score 706 as value.

The consolidation module 420 can also include a multiplication module 708. The multiplication module 708 calculates the weighted confidence score 712 for the category identifier 208 by multiplying the weighted F-measure 448 and the total confidence score 706 for the category identifier 208. The weighted F-measure 448 is the output from the accuracy measure generation module 440.

The consolidation module 420 can also include a clean-up module 714. The clean-up module 714 eliminates the category identifier 208 for the point of interest if the weighted confidence score 712 from the multiplication module 708 is less than the threshold 716.

The consolidation module 420 can be shown in pseudo code format as the following pseudo code 3:

```
function consolidation( ){
    for each POI{
        for each (category id, confidence){
            totalConfidenceScore = 0
            if (confidenceScoreMap.contains(category_id)){
                totalConfidenceScore =
                    confidenceScoreMap.getValue(category_id)
            }
            totalConfidenceScore = totalConfidenceScore + confidence
            confidenceScoreMap.add(category_id, totalConfidenceScore)
        }
        for each category_id in confidenceScoreMap{
            weightedConfidenceScore = F-measure *
                confidenceScoreMap.get(category_id)
            if (weightedConfidenceScore < committee_threshold){
                drop the category_id for the POI
            }
        }
    }
}
```

Table 3 maps functions and elements from pseudo code 3 to the previously detailed modules and elements:

| Pseudo Code 3 Elements | Specification Modules or Elements |
|---|---|
| function consolidation( ){ | the consolidation module 420 |
| for each (category id, confidence){ | total confidence score module |

-continued

| Pseudo Code 3 Elements | Specification Modules or Elements |
|---|---|
| totalConfidenceScore = 0<br>if (confidenceScoreMap.contains(category_id)){<br>    totalConfidenceScore = confidenceScoreMap.getValue(category_id)<br>}<br>totalConfidenceScore = totalConfidenceScore + confidence<br>    confidenceScoreMap.add(category_id, totalConfidenceScore)<br>} | 702. |
| totalConfidenceScore<br>confidenceScoreMap | total confidence score 706<br>hashmap with category identifier as key and confidence score as value |
| for each category_id in confidenceScoreMap{<br>    weightedConfidenceScore = F-measure * confidenceScoreMap.get(category_id) | multiplication module 708 |
| weightedConfidenceScore<br>F-measure | weighted confidence score 712<br>Weighted F-measure 448 from accuracy measure generation module 440 |
| if (weightedConfidenceScore < committee_threshold){<br>    drop the category_id for the POI | clean-up module 714 |
| committee_threshold | threshold 716 |

The modules in FIG. 7 can be implemented by hardware acceleration units (not shown) in the control units or separate hardware units (not shown) outside the control units but with the first device 102 or the second device 106.

Figure 8:
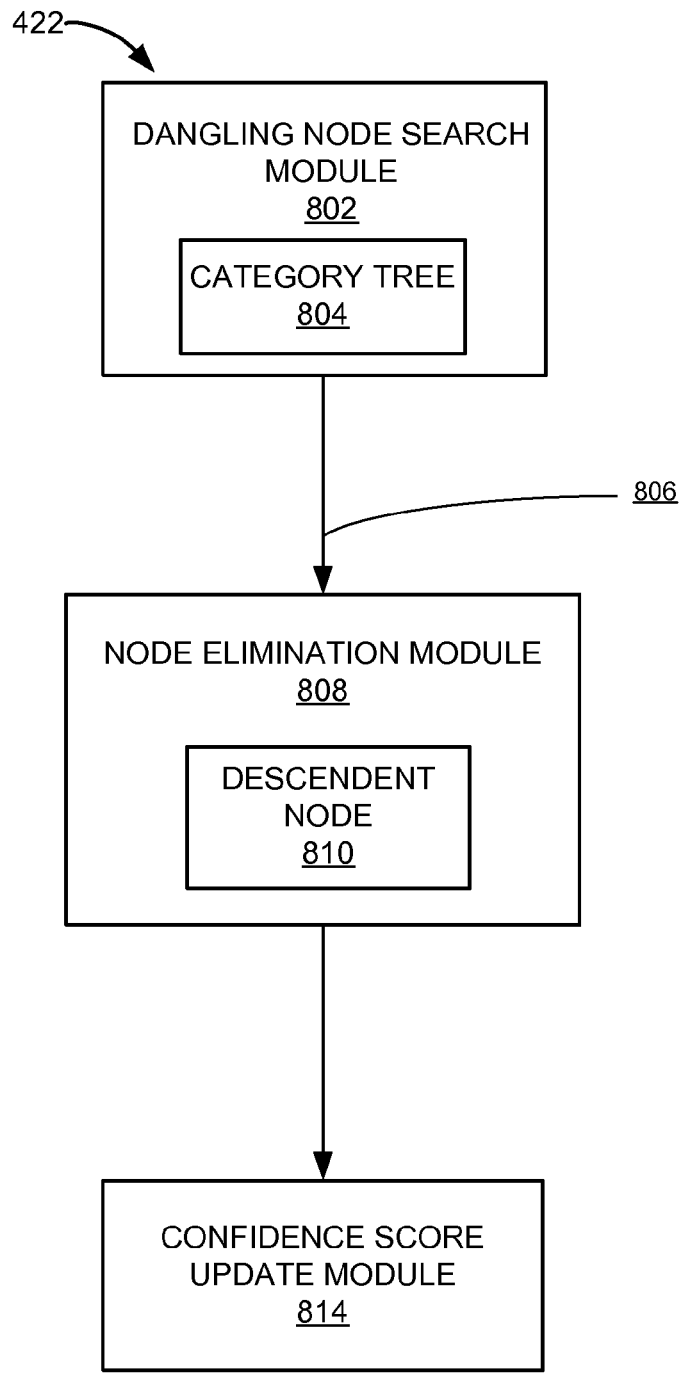
FIG. 8 is a control flow of the category tree process module.

Referring now to FIG. 8, therein is shown a control flow of the category tree process module 422. The category tree process module 422 removes the dangling node 806 from the category tree 804 by searching from leaf node to root node.

The category tree process module 422 can include a dangling node search module 802. The dangling node search module 802 looks for the dangling node 806 which has no parent node from leaf node to root node.

The category tree process module 422 can also include a node elimination module 808. The node elimination module 808 eliminates the dangling node 806 and the descendant node 810.

The category tree process module 422 can also include a confidence score update module 814. The confidence score update module 814 updates the confidence score 416 according to the corresponding eliminated category tree nodes.

The category tree process module 422 can be shown in pseudo code format as the following pseudo code 4:

```
function treeBasedClassification( ){
    for each leaf category ID ci ⊂ c {
        current_node = ci
        while (Parent(current_node) ≠ root node){
            if (Parent(current_node) ⊂ c){
                current_node = Parent(current_node)
            }
            else{
                delete current_node from c
                delete its descendants from c
                update corresponding confidence scores
                break while
            }
        }
    }
}
```

Table 4 maps functions and elements from pseudo code 4 to the previously detailed modules and elements:

| Pseudocode 2 Elements | Specification Modules or Elements |
|---|---|
| function treeBasedClassification | the category tree process module 422 |
| for each leaf category ID ci ⊂ c<br>    current_node = ci<br>    while (Parent(current_node) ≠ root node){<br>        if (Parent(current_node) ⊂ c){<br>            current_node = Parent(current_node)<br>    }<br>    else{ | dangling node search module 802 |
| delete current_node from c<br>delete its descendants from c | node elimination module 808 |
| current_node | dangling node 806 |
| Descendants | descendant node 810 |
| update corresponding confidence scores<br>    break while | confidence score update module 814 |

Thus, it has been discovered that the navigation system 100 of the present invention furnishes important and heretofore unknown and unavailable solutions, capabilities, and functional aspects for generating more accurate categorized point of interest 204. The present invention classifies uncategorized point of interest 414 using the trained classifier 410, improves the classification accuracy by consolidating the categorized point of interest 204 using the weighted F-measure 448 and the pair of the category identifier 208 and the confidence score 416, further improves the classification accuracy by eliminating the dangling node 806 and the descendent node 810, eliminating the incorrect category identifier 425 from the mutually exclusive category identifiers 426, and calculates the weighted F-measure 448 to feedback to improve consolidation performance. As a result, the user can use the navigation system 100 with more accurate categorized point of interest 204.

The physical transformation from displaying the category identifier 208 results in movement in the physical world, such as people using the first device 102, the vehicle, or a combination thereof, based on the operation of the navigation system 100. As the movement in the physical world occurs, the movement itself creates additional information that is converted back to the categorized point of interest 204 for the continued operation of the navigation system 100 and to continue the movement in the physical world.

The navigation system 100 describes the module functions or order as an example. The modules can be partitioned differently. For example, the category tree process module 422 and the mutually exclusive categories module 424 can be combined. Each of the modules can operate individually and independently of the other modules.

Furthermore, data generated in one module can be used by another module without being directly coupled to each other. For example, the accuracy measure generation module 440 can receive the categorized point of interest 204 from the category tree process module 422.

The modules in FIG. 8 can be implemented by hardware acceleration units (not shown) in the control units or separate hardware units (not shown) outside the control units but with the first device 102 or the second device 106.

Figure 9:
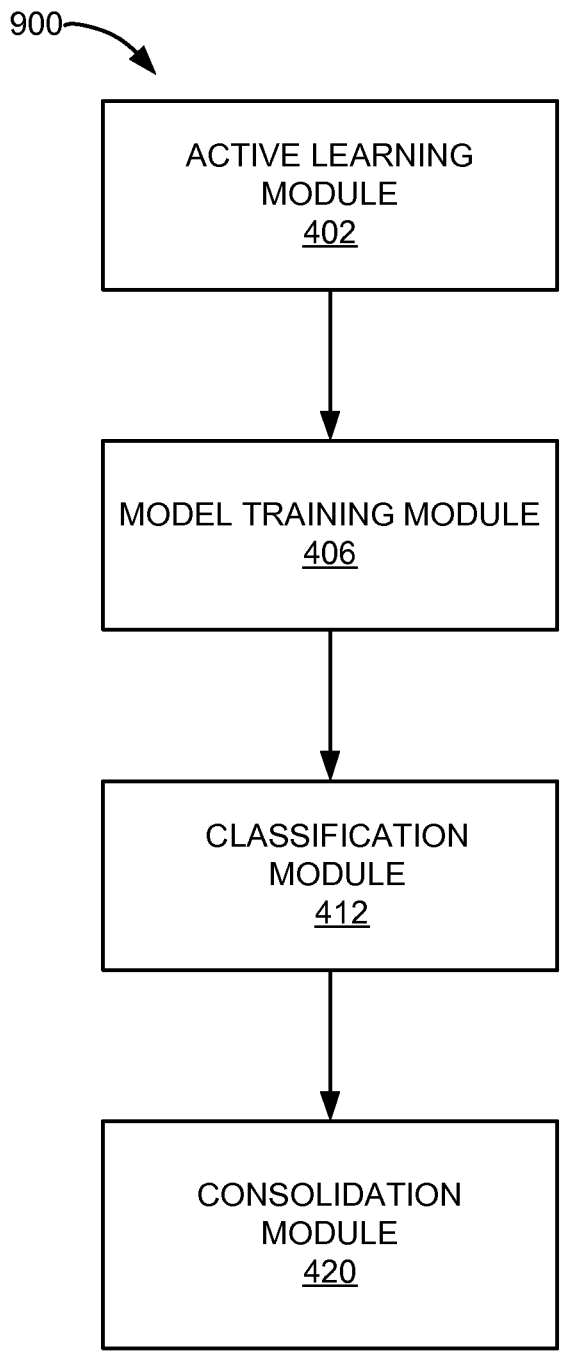
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: generating a training data from a randomly sampled uncategorized point of interest in a block 402; generating a trained classifier model by training a classifier model using the training data in a block 406; generating a category identifier, a confidence score, or a combination thereof for an uncategorized point of interest using the trained classifier model in a block 412; generating a categorized point of interest by assigning the category identifier to the uncategorized point of interest in a block 412; calculating a weighted confidence score based on a weighted F-measure for the category identifier, a pair of the category identifier and the confidence score in a block 420; and consolidating the categorized point of interest based on the weighted confidence score for the category identifier being meeting or exceeding a threshold for displaying on a device in a block 420.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating a training data with a control unit from a randomly sampled uncategorized point of interest;
generating a trained classifier model by training a classifier model using the training data;
generating a category identifier and confidence score for an uncategorized point of interest using the trained classifier model;
generating a categorized point of interest by assigning the category identifier to the uncategorized point of interest;
calculating a weighted confidence score based on a weighted F-measure for the category identifier, a pair of the category identifier and the confidence score;
consolidating the categorized point of interest based on the weighted confidence score for the category identifier being meeting or exceeding a threshold for displaying on a device;
searching a total category set for the categorized point of interest;
generating a minimum category set contains an incorrect category identifier from the total category set; and
generating a maximum category set without the incorrect category identifier by eliminating the minimum category set from the total category set for the categorized point of interest.

2. The method as claimed in claim 1 further comprising:
generating a category tree having the categorized point of interest; and
processing the category tree by eliminating a dangling node and a descendent node.

3. The method as claimed in claim 1 further comprising:
calculating the weighted F-measure for the category identifier based on a weighted precision, a weighted recall and a search weight.

4. The method as claimed in claim 1 wherein calculating the weighted confidence score includes:
calculating a total confidence score for the category identifier for the categorized point of interest based on the pair of the category identifier and confidence score; and
generating the weighted confidence score based on the total confidence score and the weighted F-measure for the category identifier for the categorized point of interest.

5. The method as claimed in claim 1 wherein generating the training data includes:
generating a random query result using a positive keyword and a negative keyword for the category identifier to query the randomly sampled uncategorized point of interest;
verifying the random query result is positive or negative for the category identifier and generating the training data by associating the random query result which is positive with the category identifier;

updating the trained classifier model by training the classifier model using the training data;
updating the category identifier and the confidence score by classifying the randomly sampled uncategorized point of interest utilizing the trained classifier model;
generating an initially classified POI based on the confidence score for the category identifier being less than a fixed threshold; and
correcting the initially classified POI and updating the training data with a correctly categorized point of interest.

6. A method of operation of a navigation system comprising:
generating a training data with a control unit from a randomly sampled uncategorized point of interest;
generating a trained classifier model by training a classifier model using the training data;
generating a category identifier and a confidence score for an uncategorized point of interest using the trained classifier model;
generating a categorized point of interest by assigning the category identifier to the uncategorized point of interest;
calculating a weighted confidence score based on a weighted F-measure for the category identifier, a pair of the category identifier and the confidence score;
consolidating the categorized point of interest based on the weighted confidence score for the category identifier being meeting or exceeding a threshold for displaying on a device;
searching a total category set for the categorized point of interest;
generating a minimum category set contains an incorrect category identifier from the total category set;
generating a maximum category set without the incorrect category identifier by eliminating the minimum category set from the total category set for the categorized point of interest; and
processing mutually exclusive category identifiers for the categorized point of interest by eliminating the incorrect category identifier.

7. The method as claimed in claim 6 further comprising:
calculating the weighted F-measure for the category identifier based on a precision, a recall and a search weight.

8. The method as claimed in claim 6 wherein calculating the weighted confidence score includes:
calculating a total confidence score for the category identifier for the categorized point of interest based on the pair of the category identifier and the confidence score; and
generating the weighted confidence score based on the total confidence score and the weighted F-measure for the category identifier for the categorized point of interest.

9. The method as claimed in claim 6 wherein eliminating the incorrect category identifier includes:
eliminating the incorrect category identifier with the smaller confidence score when there are only two category identifiers assigned to the categorized point of interest; and
eliminating the incorrect category identifier with a smaller total probability confidence when there are more than two category identifiers assigned to the categorized point of interest.

10. A navigation system comprising:
a control it for:
generating a training data from a randomly sampled uncategorized point of interest,
generating a trained classifier model by training a classifier model using the training data,
generating a category identifier and a confidence score for an uncategorized point of interest and generating a categorized point of interest with the trained classifier model,
calculating a weighted confidence score based on a weighted F-measure for the category identifier, a pair of the category identifier and the confidence score,
consolidating the categorized point of interest based on the weighted confidence score for the category identifier being meeting or exceeding a threshold,
searching a total category set for the categorized point of interest,
generating a minimum category set contains an incorrect category identifier from the total category set,
generating a maximum category set without the incorrect category identifier by eliminating the minimum category set from the total category set for the categorized point of interest, and
a communication interface, coupled to the control unit, for transmitting the categorized point of interest for displaying on a device.

11. The system as claimed in claim 10 wherein the control unit is for:
generating a category tree having the categorized point of interest; and
processing the category tree by eliminating a dangling node and a descendent node.

12. The system as claimed in claim 10 wherein the control unit is for calculating the weighted F-measure for the category identifier based on a weighted precision, a weighted recall and a search weight.

13. The system as claimed in claim 10 wherein the control unit is for:
calculating a total confidence score for the category identifier for the categorized point of interest based on the pair of the category identifier and the confidence score;
generating the weighted confidence score based on the total confidence score and the weighted F-measure for the category identifier for the categorized point of interest; and
eliminating the category identifier with weighted confidence score less than the threshold.

14. The system as claimed in claim 10 wherein the control unit is for:
generating a random query result using a positive keyword and a negative keyword for the category identifier to query the randomly sampled uncategorized point of interest;
verifying the random query result is positive or negative for the category identifier and generating the training data by associating the random query result which is positive with the category identifier;
storing the training data generated by the category assignment module;
updating the trained classifier models by training the classifier models using the training data;
updating the category identifier, the confidence score, or a combination thereof by classifying the randomly sampled uncategorized point of interest utilizing the trained classifier model;
generating an initially classified POI based on the confidence score for the category identifier being less than a fixed threshold; and correcting the initially classified POI and updating the training data with the correctly classified point of interest.

15. The system as claimed in claim 10 wherein the control unit is processing mutually exclusive category identifiers for the categorized point of interest by eliminating an incorrect category identifier.

16. The system as claimed in claim 15 wherein the control unit is for calculating the weighted F-measure for the category identifier based on a weighted precision, a weighted recall and a search weight.

17. The system as claimed in claim 15 wherein the control unit is for:
   eliminating the incorrect category identifier with the smaller confidence score in the mutually exclusive category identifiers when there are only two category identifiers assigned to the categorized point of interest; and
   eliminating the incorrect category identifier with a smaller total probability confidence in the mutually exclusive category identifiers when there are more than two category identifiers assigned to the categorized point of interest.

18. The system as claimed in claim 15 wherein the control unit is for:
   searching a dangling node from the category tree;
   eliminating the dangling node and a descendent node; and
   updating the confidence score corresponding to the dangling node and the descendent node.

* * * * *